(12) United States Patent
Park et al.

(10) Patent No.: US 11,115,829 B2
(45) Date of Patent: Sep. 7, 2021

(54) METHOD AND APPARATUS FOR PERFORMING CHANNEL SENSING IN A WIRELESS COMMUNICATION SYSTEM

(71) Applicant: LG ELECTRONICS INC., Seoul (KR)

(72) Inventors: Hanjun Park, Seoul (KR); Joonkui Ahn, Seoul (KR); Seonwook Kim, Seoul (KR); Hyunho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 35 days.

(21) Appl. No.: 16/600,238

(22) Filed: Oct. 11, 2019

(65) Prior Publication Data

US 2020/0045558 A1 Feb. 6, 2020

Related U.S. Application Data

(63) Continuation of application No. 15/077,353, filed on Mar. 22, 2016, now Pat. No. 10,470,047.

(60) Provisional application No. 62/137,203, filed on Mar. 23, 2015, provisional application No. 62/142,481, filed on Apr. 3, 2015.

(51) Int. Cl.
*H04W 16/14* (2009.01)
*H04L 5/00* (2006.01)
*H04B 17/318* (2015.01)
*H04W 74/08* (2009.01)
*H04J 11/00* (2006.01)
*H04L 27/00* (2006.01)

(52) U.S. Cl.
CPC .......... *H04W 16/14* (2013.01); *H04B 17/318* (2015.01); *H04L 5/0048* (2013.01); *H04W 74/0808* (2013.01); *H04J 11/004* (2013.01); *H04L 27/0006* (2013.01)

(58) Field of Classification Search
None
See application file for complete search history.

(56) References Cited

U.S. PATENT DOCUMENTS

| | | |
|---|---|---|
| 2010/0008412 A1* | 1/2010 | Ito .......................... H04B 1/707 375/232 |
| 2011/0286346 A1 | 11/2011 | Barbieri et al. |
| 2013/0072241 A1 | 3/2013 | Sorrentino |
| 2013/0336195 A1 | 12/2013 | Seo et al. |
| 2014/0036853 A1 | 2/2014 | Kim et al. |
| 2015/0148053 A1 | 5/2015 | Patel et al. |
| 2015/0172950 A1 | 6/2015 | Chen et al. |
| 2015/0373554 A1 | 12/2015 | Freda et al. |
| 2016/0066195 A1 | 3/2016 | Moon et al. |

(Continued)

*Primary Examiner* — Kenny S Lin
*Assistant Examiner* — Richard Schnell
(74) *Attorney, Agent, or Firm* — Birch, Stewart, Kolasch & Birch, LLP

(57) ABSTRACT

A method for transmitting a signal by a first apparatus in a wireless communication system, includes receiving a known signal, performing, on a carrier configured in an unlicensed band, a channel sensing based on cancelling a first value from power detected during a predetermined time interval related to the channel sensing and after the carrier is determined to be idle based on the channel sensing, transmitting, on the carrier, the signal, wherein the first value is determined based on reception power of the known signal and a cancellation ratio.

10 Claims, 11 Drawing Sheets

(56) References Cited

U.S. PATENT DOCUMENTS

2016/0088617 A1\* 3/2016 Goldhamer .............. H04L 1/18
 370/330
2016/0134408 A1 5/2016 Kim et al.
2018/0054741 A1\* 2/2018 Froberg Olsson .... H04W 88/10

\* cited by examiner

METHOD AND APPARATUS FOR PERFORMING CHANNEL SENSING IN A WIRELESS COMMUNICATION SYSTEM

CROSS-REFERENCE TO RELATED APPLICATIONS

This application is a Continuation of U.S. patent application Ser. No. 15/077,353, filed on Mar. 22, 2016 (now U.S. Pat. No. 10,470,047, issued on Nov. 5, 2019), which claims the benefit of U.S. Provisional Application Nos. 62/137,203 and 62/142,481, filed on Mar. 23, 2015 and Apr. 3, 2015, respectively, all of these applications are hereby incorporated by reference as if fully set forth herein.

BACKGROUND OF THE INVENTION

Field of the Invention

The present invention relates to a wireless communication system, and more particularly, to a method and apparatus for performing channel sensing in an unlicensed band.

Description of the Related Art

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in path loss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

SUMMARY OF THE INVENTION

The present invention is directed to a method for channel sensing in a unlicensed band.

According to an embodiment of the present invention, there is provided a method for performing channel sensing in an unlicensed band in a wireless communication system, performed by a node performing channel sensing, the method comprising receiving information about a known signal to be transmitted by at least one node of a group to which the node performing the channel sensing belongs to; detecting the known signal using the information about the known signal; canceling reception power of the known signal from measured reception power, during a time period in which the known signal is detected; comparing remaining reception power except for the reception power of the known signal with a threshold; and determining whether a channel is occupied or unoccupied according to a result of the comparison, wherein the information about the known signal includes at least one of a sequence of the known signal, transmission power of the known signal, a valid duration of the reception power of the known signal, a power offset between a transmission signal and the known signal during the valid duration, or a cancelation ratio of reception power of the transmission signal during the valid duration.

Alternatively or additionally, the valid duration may include a subframe in which the known signal is detected or a subframe in which a signal of reception power to be derived from the reception power of the known signal is transmitted.

Alternatively or additionally, the known signal may include a reservation signal or a preamble to be transmitted for channel occupation after channel sensing is successful and before transmitting a signal during a channel occupancy time, or a reference signal for channel estimation and demodulation.

Alternatively or additionally, the method may further comprise if the information about the known signal includes information about the valid duration or the known signal indicates the valid duration, canceling the reception power of the known signal from measured reception power during the valid duration.

Alternatively or additionally, if the known signal is transmitted in a plurality of orthogonal frequency division multiplexing (OFDM) symbols, the known signal may be transmitted with a predetermined phase difference in different OFDM symbols to indicate remaining lengths of a transmission burst including the known signal.

Alternatively or additionally, the method may further comprise using the reception power of the known signal in calculating reception power for the channel sensing during a time period corresponding to the remaining length of the transmission burst.

According to another embodiment of the present invention, there is provided a node for performing channel sensing in an unlicensed band in a wireless communication system, the node comprising a radio frequency (RF) unit; and a processor configured to control the RF unit, wherein the processor is configured to receive information about a known signal to be transmitted by at least one node of a group which the node performing the channel sensing belongs to, detect the known signal using the information about the known signal, cancel reception power of the known signal from measured reception power, during a time period in which the known signal is detected, compare remaining reception power except for the reception power of the known signal with a threshold, and determine whether a channel is occupied or unoccupied according to a result of the comparison, and wherein the information about the known signal includes at least one of a sequence of the known signal, transmission power of the known signal, a valid duration of the reception power of the known signal, a power offset between a transmission signal and the known signal during the valid duration, or a cancelation ratio of reception power of the transmission signal during the valid duration.

Alternatively or additionally, the valid duration may include a subframe in which the known signal is detected or a subframe in which a signal of reception power to be derived from the reception power of the known signal is transmitted.

Alternatively or additionally, the known signal may include a reservation signal or a preamble to be transmitted for channel occupation after channel sensing is successful and before a signal is transmitted during a channel occupancy time, or a reference signal for channel estimation and demodulation.

Alternatively or additionally, if the information about the known signal includes information about the valid duration or the known signal may indicate the valid duration, the processor is configured to cancel the reception power of the known signal from measured reception power during the valid duration.

Alternatively or additionally, if the known signal is transmitted in a plurality of orthogonal frequency division multiplexing (OFDM) symbols, the known signal may be transmitted with a predetermined phase difference in different OFDM symbols to indicate remaining lengths of a transmission burst including the known signal.

Alternatively or additionally, the processor may be configured to use the reception power of the known signal in calculating reception power for the channel sensing during a time period corresponding to the remaining length of the transmission burst.

The aforementioned technical solutions are merely parts of embodiments of the present invention and various embodiments in which the technical features of the present invention are reflected can be derived and understood by a person skilled in the art on the basis of the following detailed description of the present invention.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
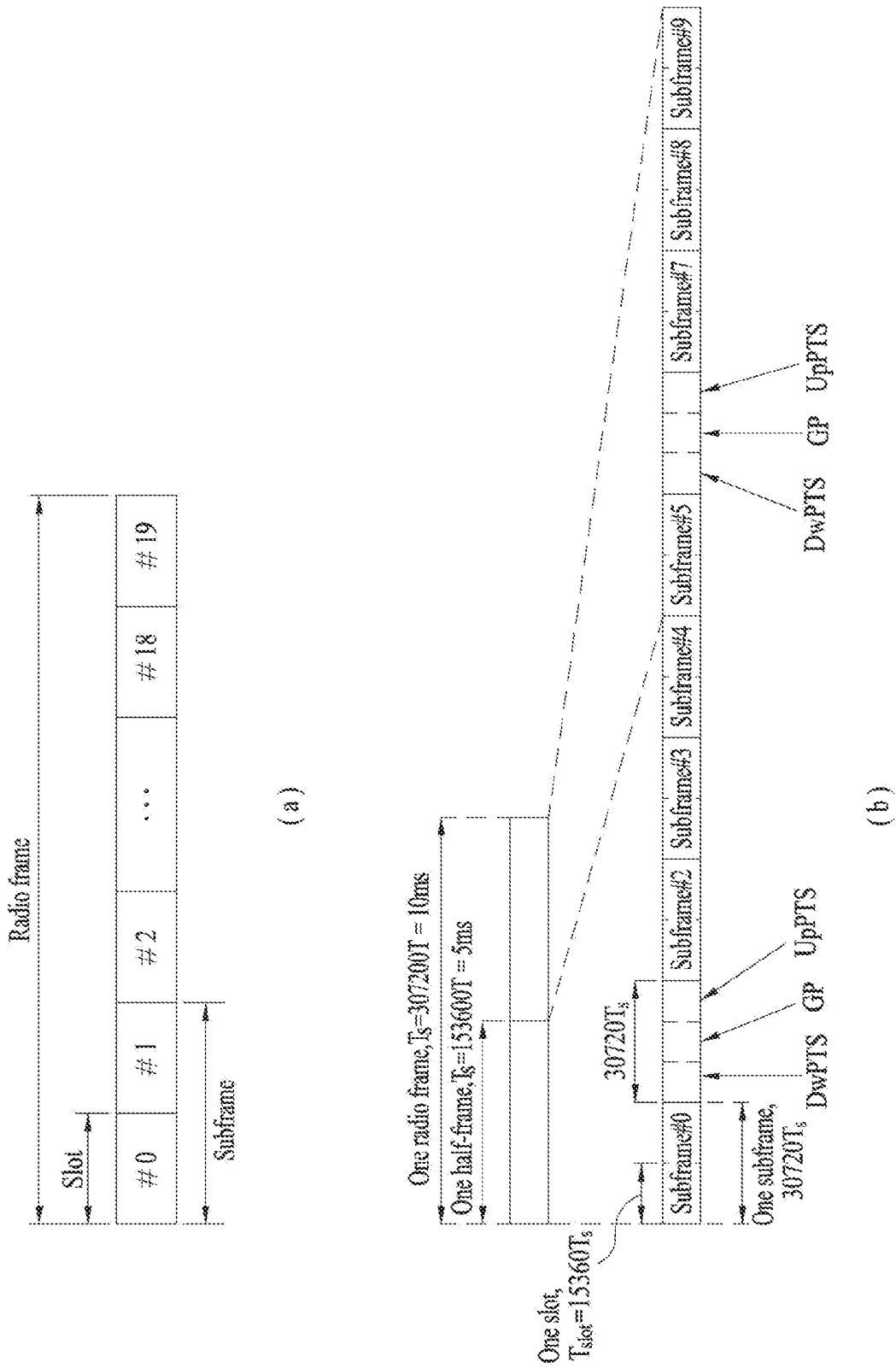
FIG. 1 illustrates exemplary radio frame structures in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Techniques, apparatus and systems described herein can be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as Universal Terrestrial Radio Access (UTRA) or CDMA2000. The TDMA may be implemented with a radio technology such as Global System for Mobile communications (GSM)/ General Packet Radio Service (GPRS)/Enhanced Data Rates for GSM Evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink and employs the SC-FDMA in uplink. LTE-advanced (LTE-A) is an evolution of the 3GPP LTE. For clarity, this application focuses on the 3GPP LTE/LTE-A. However, technical features of the present invention are not limited thereto.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/ received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |

TABLE 2-continued

|  | Normal cyclic prefix in downlink | | | Extended cyclic prefix in downlink | | |
| --- | --- | --- | --- | --- | --- | --- |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 3 | 24144 · $T_s$ | 4384 · $T_s$ | 5120 · $T_s$ | 25600 · $T_s$ | 4384 · $T_s$ | 5120 · $T_s$ |
| 4 | 26336 · $T_s$ | | | 7680 · $T_s$ | | |
| 5 | 6592 · $T_s$ | | | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
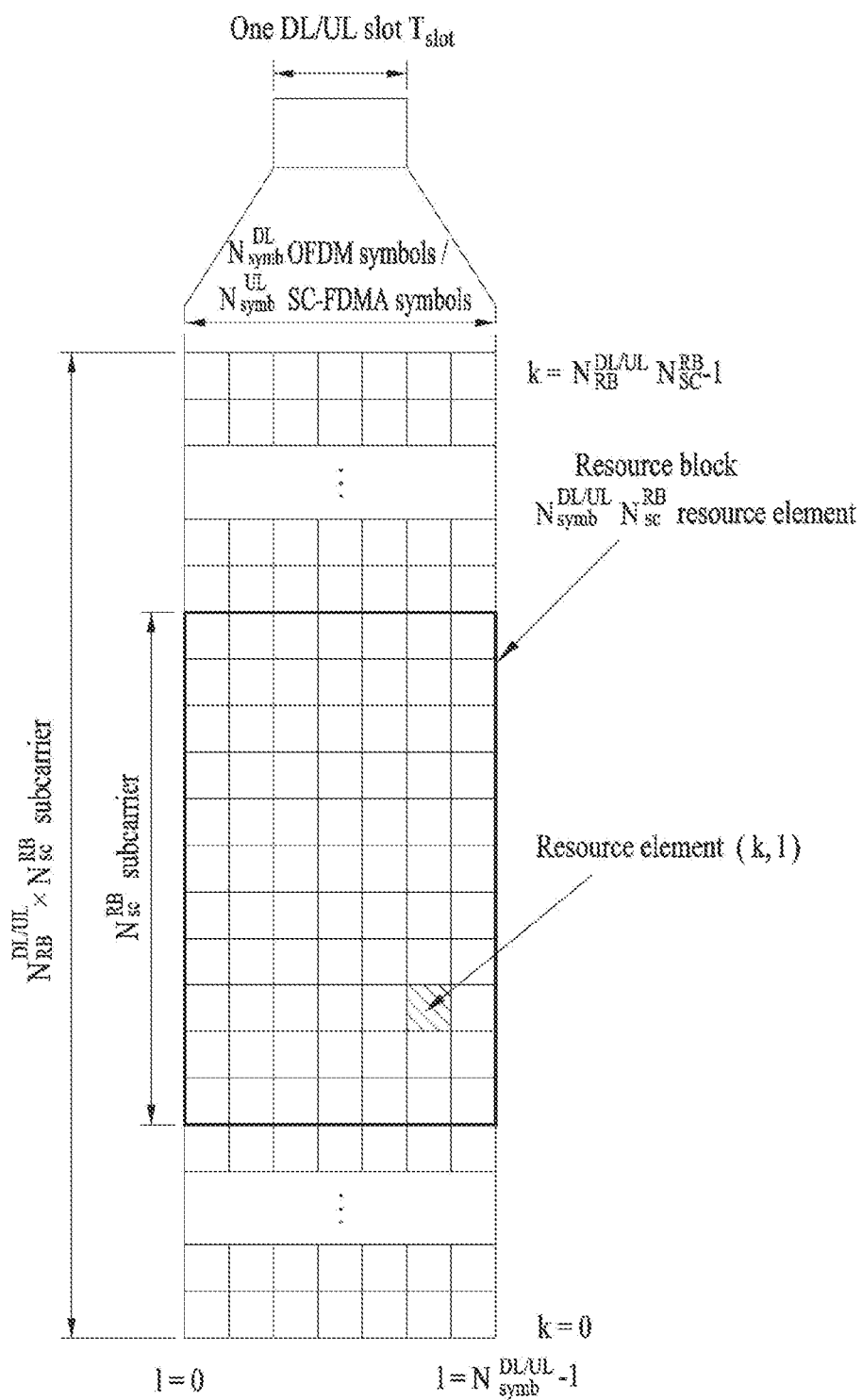
FIG. 2 illustrates an exemplary structure of a downlink (DL)/uplink (UL) slot in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and 1 is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
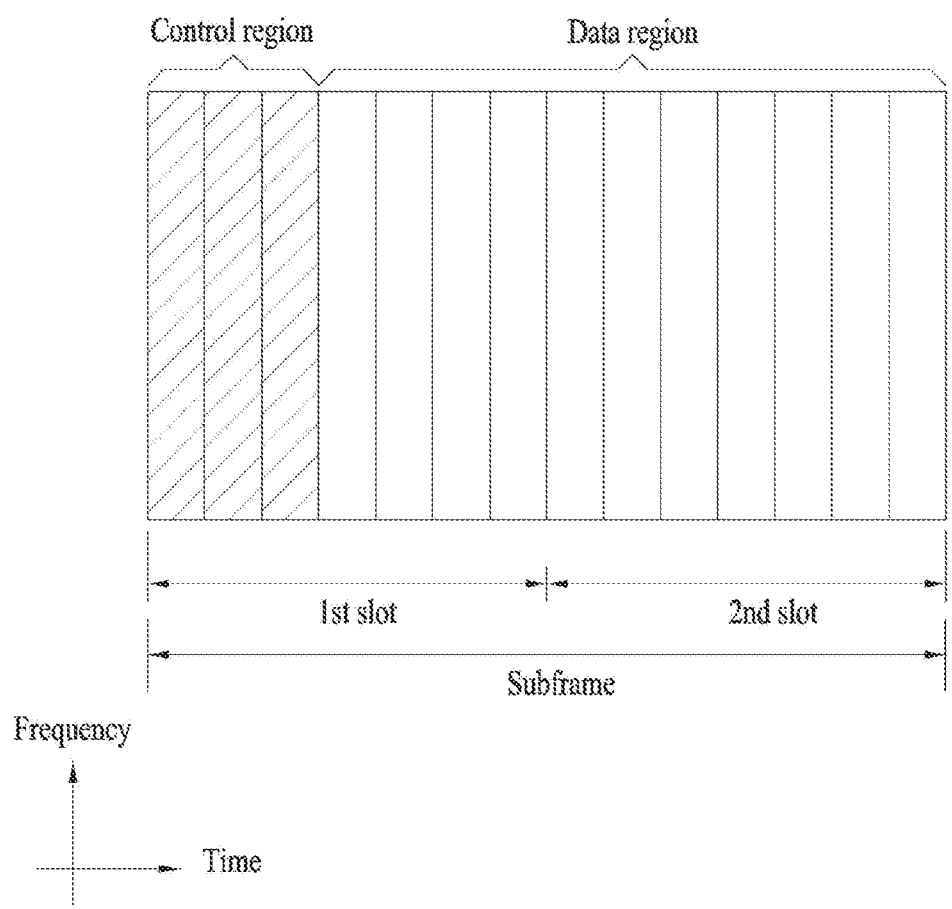
FIG. 3 illustrates an exemplary structure of a DL subframe in a $3^{rd}$ generation partnership project (3GPP) long term evolution (LTE)/LTE-advanced (LTE-A) system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space | | | Number of PDCCH |
|---|---|---|---|
| Type | Aggregation Level L | Size [in CCEs] | candidates $M^{(L)}$ |
| UE-specific | 1 | 6 | 6 |
|  | 2 | 12 | 6 |
|  | 4 | 8 | 2 |
|  | 8 | 16 | 2 |

TABLE 3-continued

| Search Space | | | Number of PDCCH |
|---|---|---|---|
| Type | Aggregation Level L | Size [in CCEs] | candidates $M^{(L)}$ |
| Common | 4 | 16 | 4 |
|  | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
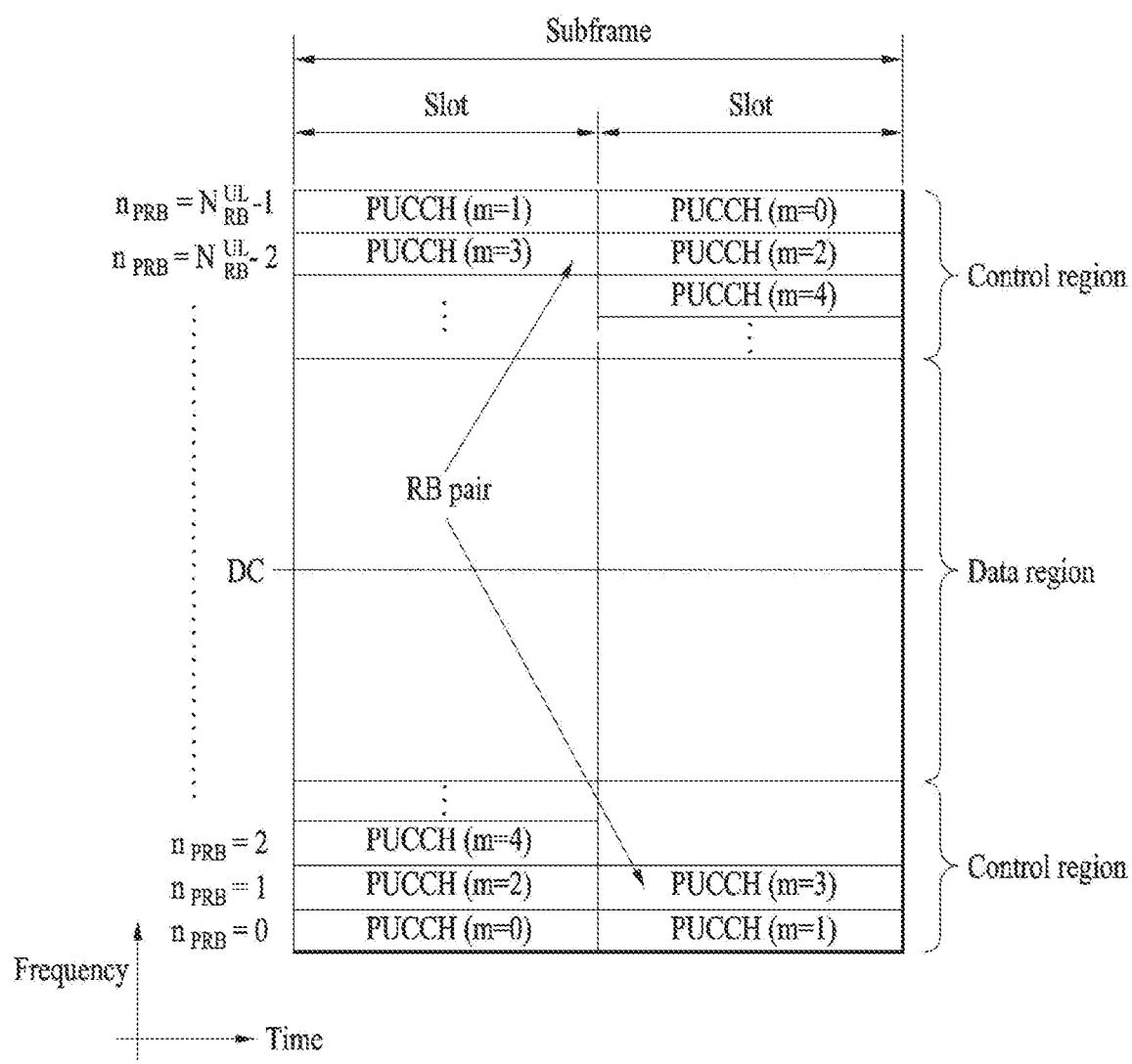
FIG. 4 illustrates an exemplary structure of a UL subframe in the 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |

TABLE 4-continued

| PUCCH format | Modulation scheme | Number of bits per subframe, $M_{bit}$ | Usage | Etc. |
| --- | --- | --- | --- | --- |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Along with a rapid increase in data traffic attributed to the recent proliferation of smartphones, a future-generation wireless communication system such as 3GPP LTE-A seeks to efficiently utilize a limited frequency band. In this context, operating a cellular network such as an LTE system in an unlicensed band of 2.4 GHz or 5 GHz is under consideration.

Since it is basically assumed that wireless transmission and reception is performed in an unlicensed band through contention between communication nodes, each communication node is requested to make sure that another communication node is not transmitting a signal in the unlicensed band, by channel sensing before transmitting a signal. For the convenience of description, this operation is called listen before talk (LBT) and particularly, an operation for determining whether any other communication node is transmitting a signal is defined as carrier sensing (CS) or clear channel assessment (CCA). If it is determined as a result of CCA that there is no other communication node transmitting a signal, this state is defined as a channel unoccupied state. On the contrary, if there is any other communication node transmitting a signal, this state is defined as a channel occupied state. If an eNB or a UE is to transmit a signal in an unlicensed band in an LTE system, the eNB or the UE should perform LBT. While the eNB or the UE is transmitting a signal, nodes conforming to other communication standards such as Wi-Fi should not interfere with the eNB or the UE by performing LBT. For example, a Wi-Fi standard (e.g., 802.11ac) regulates that a CCA threshold is −62 dBm for a non-Wi-Fi signal and −82 dBm for a Wi-Fi signal. This means that upon receipt of a non-Wi-Fi signal with power (or energy) equal to or higher than −62 dBm, a station (STA) or an access point (AP) does not transmit a signal in order not to cause interference.

Figure 5:
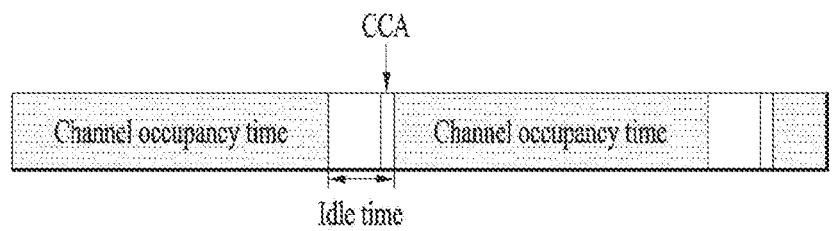
FIG. 5 illustrates an exemplary listen before talk (LBT) channel access operation based on frame based equipment (FBE)

For example, two LBT-based channel access mechanisms are defined in Europe, frame based equipment (FBE) and load based equipment (LBE). In FBE, one frame is comprised of a channel occupancy time (e.g., 1 to 10 ms) being a time period over which a communication node succeeding in channel access may continue transmission, and an idle time being at least 5% of the channel occupancy time, and CCA is defined as an operation for monitoring a channel during at least 20 μs at the last part of the idle time. A communication node periodically performs CCA on a frame basis. If the channel is unoccupied, the communication node transmits data during the channel occupancy time. On the other hand, if the channel is occupied, the communication node defers transmission and waits until a CCA slot of the next period. FIG. 5 illustrates an example of the FBE operation.

Figure 6:
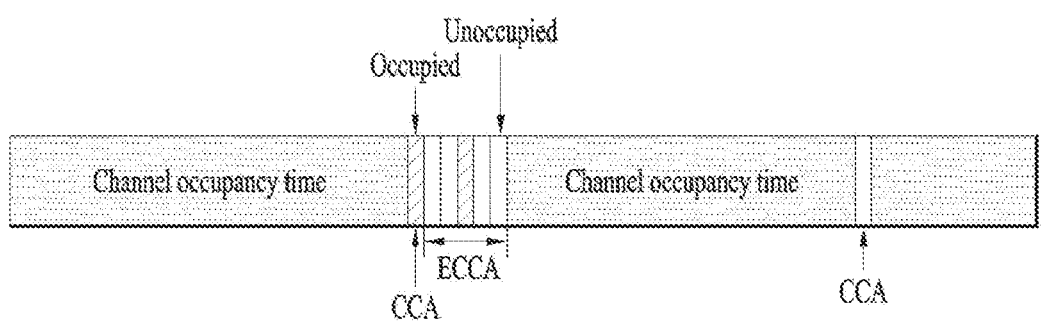
FIG. 6 illustrates an exemplary an LBT channel access operation based on load based equipment (LBE)
Figure 7:
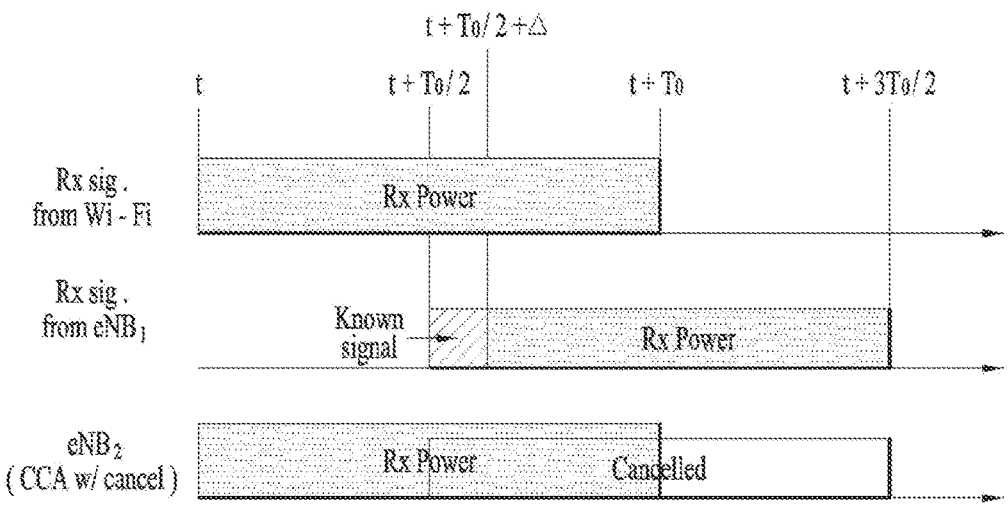
FIG. 7 illustrates an example of canceling reception power of a transmission signal of a node within the same group according to an embodiment of the present invention.

In LBE, the communication node first sets q (q∈{4, 5, . . . , 32}) and then performs CCA for one slot. If the channel is unoccupied in a first CCA slot, the communication node may transmit data by securing a channel occupancy time of (13/32)q ms. On the contrary, if the channel is occupied in the first CCA slot, the communication node selects N (N∈{1, 2, . . . , q}) arbitrarily (i.e., randomly) and stores the selected N value as an initial value for a counter. Then, the communication node senses a channel state on a CCA slot basis. Each time the channel is unoccupied in one specific CCA slot, the communication node decreases the value of the counter by 1. If the value of the counter is 0, the communication node (or UE) may transmit data during the channel occupancy time of (13/32)q ms. FIG. 6 illustrates an example of the LBE operation.

In the above examples, the channel occupied state or the channel unoccupied state may be determined by checking whether reception power exceeds a predetermined threshold in a CCA slot.

In general, a wireless business operator divides a spatial area into cells each having appropriate coverage and enables an eNB of each cell to conduct wireless communication with UEs within the cell, thereby minimizing interference between cells and thus allowing simultaneous transmissions between neighbor cells. The resulting maximization of frequency reuse (FR) may increase overall system performance. The FR maximization operation may also be preferred when the LTE system operates in an unlicensed band. However, since LTE nodes (e.g., eNBs or UEs) transmit signals in the unlicensed band by LBT, if a specific node is first occupying a channel and transmitting a signal on the channel, the other nodes are highly likely not to reuse the frequency, determining that the channel is occupied according to their CCA results.

From the perspective of maximizing FR in the unlicensed band in the LBT-based LTE system, it is preferable that a node group (e.g., eNBs managed by the same business operator) capable of (or recommended for) simultaneous transmissions is defined, each node of the node group should be able to recognize signal transmission from another node within the group and cancel power (or energy) of the signal transmission during power detection (or energy detection) for CCA. In one method, a node of the node group recommended for simultaneous transmissions may transmit a known signal during signal transmission, and other nodes of the group may recognize the known signal, eliminate the known signal, and then perform power detection (or energy detection) in a CCA slot. That is, the other nodes may cancel power (or energy) of the known signal transmitted by the node of the group during CCA.

However, the above operation has its limitations in that only when CCA is performed in the presence of the known signal, the power (or energy) of the known signal may be canceled during the CCA. Accordingly, the present invention proposes that if there are nodes in a node group capable of (or recommended for) simultaneous transmissions and at least one of the nodes is able to transmit a known signal, information about the known signal (for example, power, a sequence, a power offset, etc. of the known signal) is shared among the nodes, and reception power (or energy) for the node transmitting the known signal is canceled using the information about the known signal, at a non-transmission time of the known signal during CCA. Additionally, a method for using an orthogonal cover code (OCC) to reduce the complexity of detection of a known signal is proposed.

CCA Scheme Based on Power Information about Known Signal, for FR Maximization

According to a specific embodiment of the present invention, a node transmitting a known signal (i.e., a transmitting node) in a node group capable of (or recommended for) simultaneous transmissions may indicate at least one of the following pieces of information to the other nodes of the node group:

a sequence of the known signal (for example, a seed value for generation of the sequence);

(transmission) power of the known signal;

a valid time (or a valid duration) of transmitting a signal of which the reception power may be derived from reception power of the known signal (the valid time may be defined based on a detection time of the known signal);

a power offset between the transmission signal and the known signal at the valid time; and a cancellation ratio (e.g., $0 \le \alpha \le 1$) of reception power of the transmission signal at the valid time.

It is proposed that upon detection of the known signal transmitted by the specific node of the group, the other nodes of the node group, which perform CCA, recognize the valid time based on the detection time of the known signal, calculate reception power (or energy) of the transmission signal of the transmitting node at the valid time using 'the power offset between the transmission signal and the known signal at the valid time', and cancel all of the calculated reception power or as much of the calculated reception power as 'the cancelation ratio of the reception power of the transmission signal at the valid time' during the CCA.

If the CCA-performing nodes detect a plurality of known signals, the nodes may determine reception power from nodes transmitting the known signals using power offsets between transmission signals and the known signals at valid times and sequentially cancel the reception power of the transmitting nodes in total reception power.

If the remaining reception power (or energy) after the cancellation is lower than a predetermined CCA threshold, the CCA-performing nodes may perform signal transmission during a channel occupancy time, determining the channel is unoccupied.

The valid time may include a transmission time of the known signal, and the known signal may be a reservation signal (or preamble) that the node transmits to occupy the channel from a time of CCA success to before data transmission, or an RS (e.g., CRS, DM-RS, or CSI-RS) used for channel estimation and data demodulation.

For example, it is assumed that $eNB_1$ and $eNB_2$ belong to a node group recommended for simultaneous transmissions and share information about an afore-mentioned reservation signal, that is, a known signal. It is also assumed that $eNB_1$ transmits a transmission (Tx) burst with the same transmission power as the reservation signal, and the Tx burst is or corresponds to the 'valid time'. Then, a Wi-Fi AP and $eNB_1$ transmit Tx bursts each having length $T_0$ at time t and time $t+T_0/2$, respectively. When $eNB_1$ transmits a reservation signal at a former part of the Tx burst, that is, during a time period from $t+T_0/2$ to $t+T_0/2+\Delta$, $eNB_2$ may cancel measured reception power $P_0$ of the reservation signal from $eNB_1$ in total reception power received during a time period from $t+T_0/2+\Delta$ to $t+3T_0/2$ and then perform CCA. As a consequence, $eNB_2$ may start signal transmission after time $t+T_0$, determining that the channel is unoccupied.

According to an embodiment of the present invention, the valid time may be a subframe (SF) in which the known signal is detected or an SF in which the reception power of the known signal is determined to be valid in the LTE system. For example, if the known signal is a CRS, the valid time may be an SF in which the CRS is detected or its adjacent SF. In this case, the present invention may be described as a method for determining reception power from a specific node in other symbols of an SF in which a known signal of the specific node is detected (or other SFs in which the known signal is expected to be valid) using the reception power of the known signal and canceling the determined reception power during CCA.

As specific examples of an operation for canceling measured power of a known signal during CCA in the present invention, the following operations may be considered.

In general, cancellation of measured power of a known signal in measured total reception power during CCA may mean an operation for multiplying the measured total reception power by a specific weight (e.g., a) and subtracting the product from the total reception power.

The power of the known signal may be canceled in reception power on the assumption that power equal to or higher than the power of the known signal is transmitted during a specific time period following the known signal.

The power of the known signal may be canceled in measured reception power at the boundary of a subframe starting after measurement of the known signal, in a first subframe from an available data transmission starting time, or in a first minimum transmission unit length during CCA in a system where subframes are synchronous, whereas the power of the known signal may be canceled in the measured reception power in one subframe length or a minimum transmission length unit after detection of the known signal during CCA in a system where subframes are asynchronous.

Method for Indicating Tx Burst Interval by Applying Differential Encoding to Known Signal According to a specific embodiment of the present invention, it is proposed that if a transmitting node transmits a Tx burst including one or more transmission units (e.g., SFs) by LBT and transmits a known signal in two or more symbols in each transmission unit, the transmitting node indicates information about the remaining transmission units of the Tx burst after a current transmission unit by differentially encoding phase differences between a plurality of known signals in each transmission unit. That is, if 2×M known signals exist in each transmission unit and B-bit information is carried by one phase difference, the length of the remaining transmission units may be indicated in B×M bits using M phase differences. An arbitrary node may determine the length of the remaining transmission units of the Tx burst transmitted by the node transmitting the known signals by determining the transmission units carrying the known signals by a correlation value of a received signal using information about the sequence of the known signals of the transmitting node and detecting M phase difference values applied to 2×M known signals in the transmission unit based on information about a preset (or agreed) candidate group of phase differences. The known signals may be reservation signals (or preambles) that the node transmits to occupy a channel during a time period from a time of CCA success to before data transmission, or RSs (e.g., CRSs, DM-RSs, or CSI-RSs) used for channel estimation and data demodulation.

Figure 8:
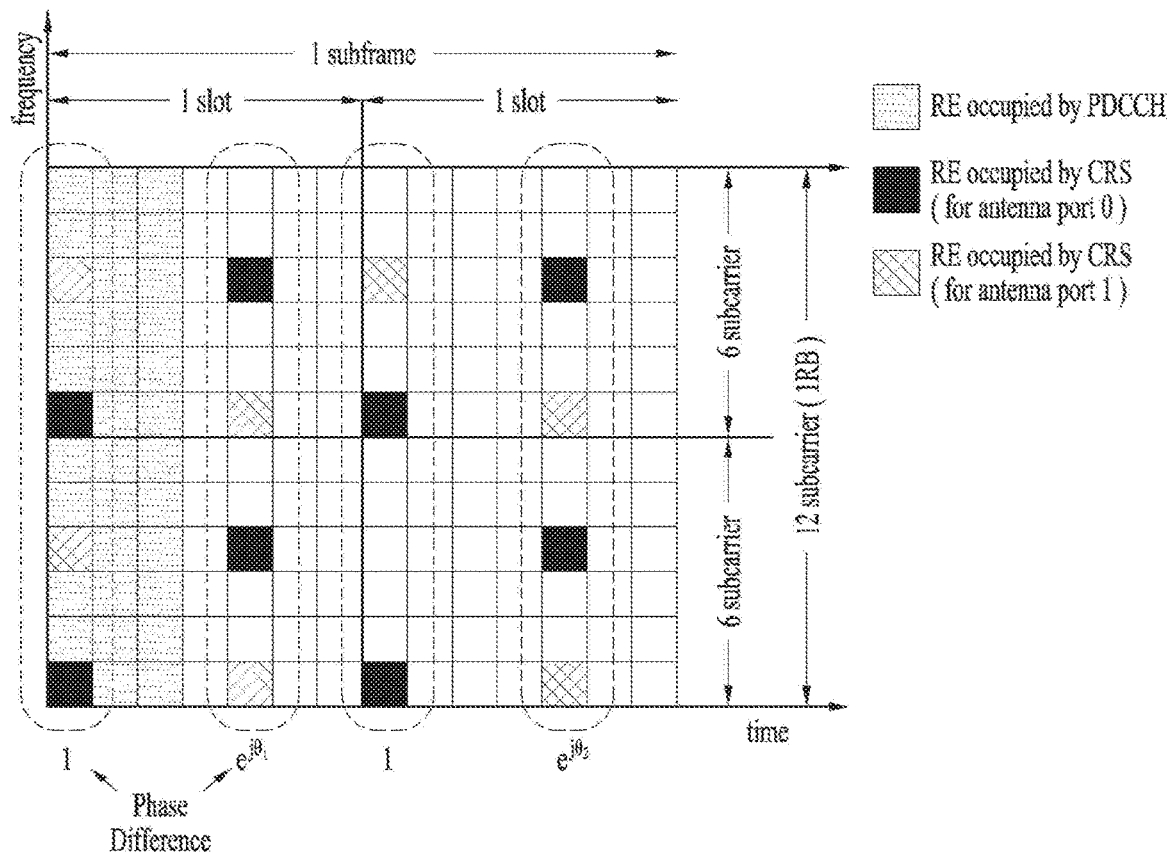
FIG. 8 illustrates phase differences applied to a known signal transmitted in different symbols according to an embodiment of the present invention.

For example, if the known signals are CRSs, a CRS for antenna port 0 may be transmitted in one SF in the LTE system, as illustrated in FIG. 8.

A phase difference expressed as $exp^{j\Theta 1}$ is applied between a CRS transmitted in a first OFDM symbol and a CRS transmitted in a $5^{th}$ OFDM symbol, and a phase difference expressed as $exp^{j\Theta 2}$ is applied between a CRS transmitted in an $8^{th}$ OFDM symbol and a CRS transmitted in an $11^{th}$ OFDM symbol, thereby indicating the remaining length of the Tx burst on an SF basis.

TABLE 5

| θ1 | θ2 | Remained Tx Burst [SF] |
|---|---|---|
| 0 | 0 | 0 |
| 0 | π | 1 |
| π | 0 | 2 |
| π | π | 3 |

If the remaining length of the Tx burst is 0 SF, this means that the current SF is the last SF of the Tx burst.

The above differential encoding-based operation is performed to, when a node performing CCA cancels reception power of a transmission signal of a transmitting node in a Tx burst transmitted by the transmitting node, using reception power (or energy) of a known signal transmitted by the transmitting node, determine the length of the Tx burst and support cancelation of the reception power in the Tx burst.

Method for Adjusting Power of Known Signal, for FR Maximization

According to a specific embodiment, a node transmitting a known signal in a node group capable of (or recommended for) simultaneous transmissions may indicate at least one of the following pieces of information to the other nodes of the node group:

a sequence of the known signal (e.g., a seed value for generation of the sequence);

transmission power of the known signal;

a transmission time or transmission period of the known signal; and power offset information that may be changed based on current transmission power of the known signal.

Each node of the node group may detect a known signal transmitted by another node of the node group, measure reception power (or energy) of the known signal, and reduce transmission power in consideration of effects on a CCA threshold of the transmitting node that the node will exert, or indicate at least one of the following pieces of information to the transmitting node:

a transmission power change request (e.g., power offset): the transmission power change request may be transmitted only when total reception power is changed to or below a CCA threshold;

a CCA threshold of the node and reception power of the detected known signal, or a difference between the CCA threshold of the node and the reception power (or energy) of the detected known signal; and a contribution ratio of the reception power of the known signal to total reception power. The total reception power may be calculated for a time period during which the node transmitting the known signal transmits a signal.

If each node of the node group receives a transmission power change request from another node of the node group, the node may apply a power offset value to transmission power of its known signal (or transmission power of an arbitrary signal).

The known signal may be a reservation signal (or preamble) which the node transmits for channel occupation during a time period spanning from a time of CCA success until to before data transmission, or an RS (e.g., CRS, DM-RS, CSI-RS, or discovery reference signal (DRS)) used for channel estimation and data demodulation.

Figure 9:
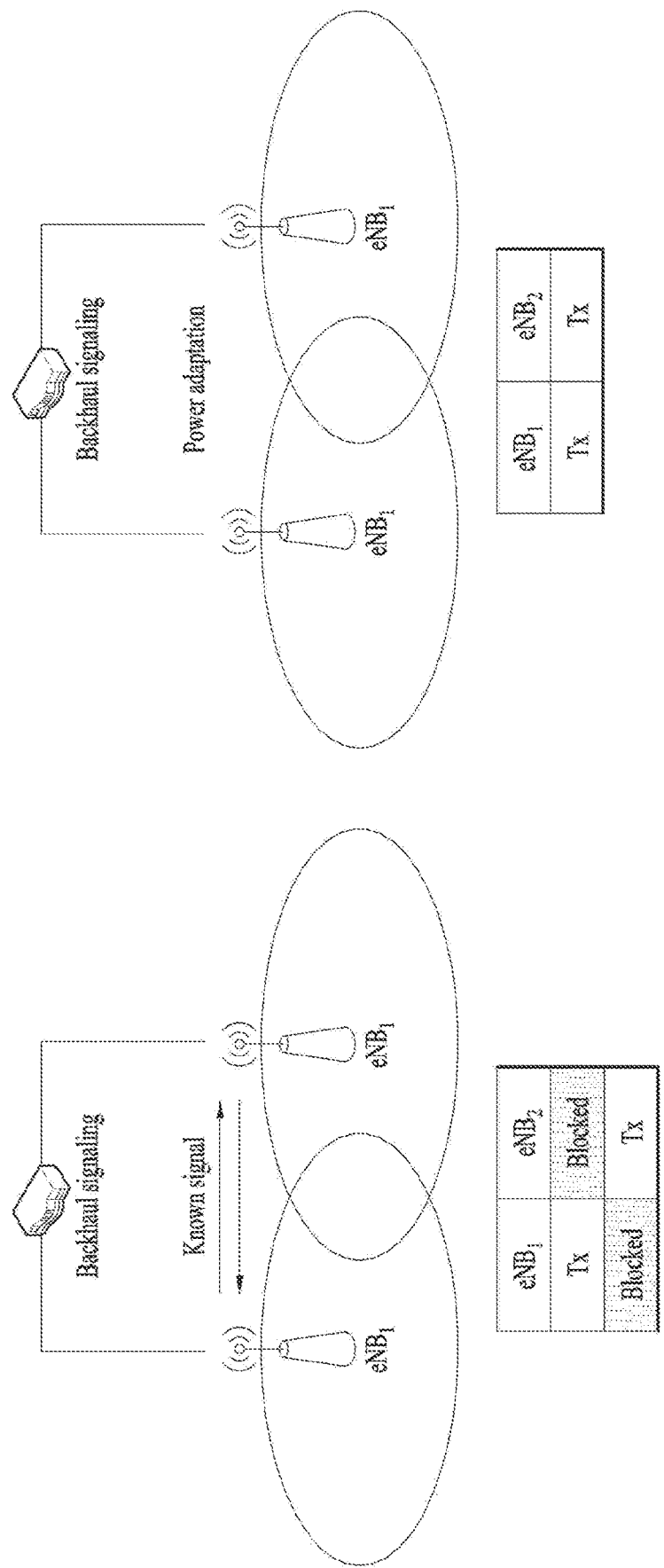
FIG. 9 illustrates transmission power-related cooperation between nodes according to an embodiment of the present invention.

For example, it is assumed that $eNB_1$ and $eNB_2$ belong to a node group recommended for simultaneous transmissions, and when $eNB_1$ transmits a signal to $eNB_2$ because $eNB_1$ and $eNB_2$ are sufficiently near to each other, $eNB_2$ does not perform signal transmission, determining that reception power from $eNB_1$ exceeds a CCA threshold. According to an embodiment of the present invention, $eNB_1$ may estimate path loss by receiving a known signal from $eNB_2$ and thus determine the magnitude of interference that a signal transmitted by $eNB_1$ causes to $eNB_2$. Then, $eNB_1$ may help $eNB_2$ to perform signal transmission by reducing its transmission power (i.e., the reception power from $eNB_1$ measured by $eNB_2$ may become lower than a CCA threshold). FIG. 9 illustrates an example of this operation.

Or $eNB_1$ may indicate a range in which $eNB_1$ may change its transmission power to $eNB_2$, and $eNB_2$ may request reduction of transmission power to $eNB_1$, for CCA success of $eNB_2$ in FIG. 9.

Method for Performing CCA Based on Orthogonal Cover Code (OCC)

According to a specific embodiment of the present invention, a network may configure an OCC set with OCCs of length B for a node group capable of (or recommended for) simultaneous transmissions, and may configure an OCC set (e.g., a first OCC group or OCC group 1) for use in transmission of a known signal from the node group and an OCC set (e.g., a second OCC group or OCC group 2) for use in CCA of the node group. Herein, the OCCs of OCC group 1 are different from the OCCs of OCC group 2, and any OCC of OCC group 1 is orthogonal to any OCC of OCC group 2.

A node transmitting a known signal may transmit the known signal (e.g., x) in N consecutive time slots by applying one OCC of OCC group 1 (e.g., c[n], n=0, 1, . . . , N−1) to the known signal.

Each of nodes performing CCA may perform at least one of the following operations.

The node sums signals by applying one OCC of OCC group 2 to the N time slots and then performs power detection (or energy detection) for CCA.

If power (or energy) detected by the above OCC-based power detection is lower than a preset CCA threshold, the node performs signal transmission during a channel occupancy time, The node determines whether there is a known signal of its node group in the N time slots.

The node attempts to detect a known signal of its node group on a time slot basis.

If the known signal is detected, the node calculates reception power (or energy) from which reception power (or energy) of the known signal is canceled in a corresponding time slot.

if the known signal is not detected, the node calculates reception power (or energy) for the time slot.

Subsequently, if the sum of reception power (or energy) of each time slot for the N time slots is lower than a preset CCA threshold, the node transmits a signal after the last time slot.

if reception power (or energy) of the last time slot is lower than the preset CCA threshold, the node transmits a signal after the last time slot.

If the power (or energy) detected by the OCC-based power detection is higher than the preset CCA threshold, the node defers signal transmission, determining that the channel is occupied.

The known signal may be a reservation signal (or preamble) that the node transmits for channel occupation during a time period spanning from a time of CCA success to before data transmission, or an RS (e.g., CRS, DM-RS, or CSI-RS) for channel estimation and data demodulation. The N time slots may be N CCA sub-slots divided from one CCA slot.

As in the above-described OCC-based CCA method, if OCCs for transmission of known signals are configured to be orthogonal to OCCs for performing CCA, a known signal transmitted by a specific node of a node group capable of (or recommended for) simultaneous transmissions with an STA is canceled by an OCC and thus the STA does not reflect the known signal in reception power (or energy) during CCA. However, in the case where the OCC-based CCA method is implemented in the LTE system, without an additional adjustment, a known signal may be canceled by a signal transmitted by a network managed by a different business operator. Therefore, if the power detected by the OCC-applied power detection is lower than the preset CCA threshold, additional power detection may be performed, as described above.

In this manner, a specific node may efficiently exclude a signal transmitted by a node of a node group capable of simultaneous transmission with the specific node from CCA.

Figure 10:
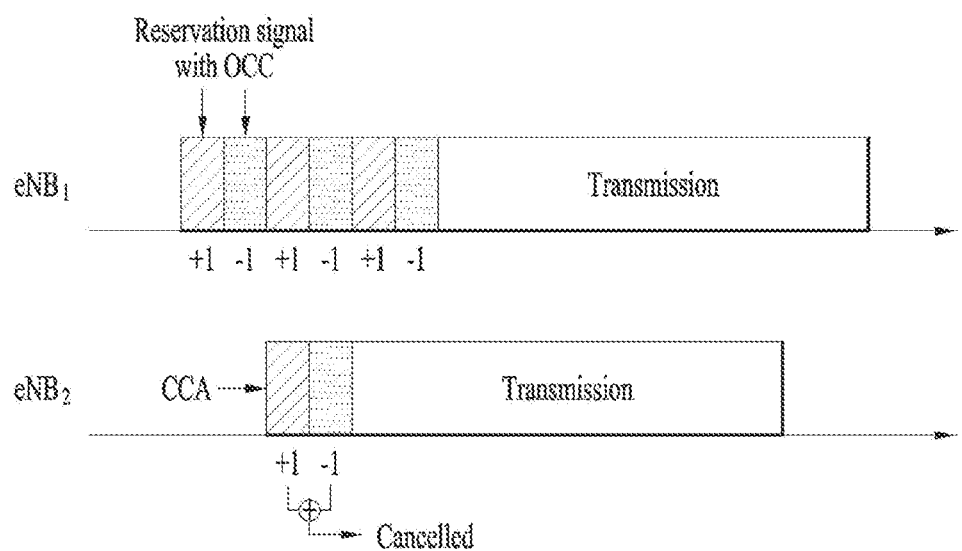
FIG. 10 illustrates exemplary orthogonal cover code (OCC)-based channel sensing according to an embodiment of the present invention.

For example, if $eNB_1$ and $eNB_2$ belong to a node group recommended for simultaneous transmissions, and $eNB_1$ transmits [+x −x] in two time slots by applying an OCC of [+1 −1] to a reservation signal, $eNB_1$ may repeat the transmission of [+x −x] in two time slots until before signal transmission. Subsequently, if $eNB_2$ may sum signals in the two time slots by applying an OCC of [+1 +1] orthogonal to the OCC of [+1 −1] and then performs CCA, the reservation signal of $eNB_1$ is canceled in the two time slots and thus reception power of the reservation signal transmitted by $eNB_1$ may be excluded during CCA. If only $eNB_1$ transmits a signal around $eNB_2$, $eNB_2$ may perform signal transmission during a channel occupancy time, determining that the channel is unoccupied during a time period of transmitting the reservation signal. FIG. 10 illustrates an example of performing CCA by applying an OCC.

A CCA threshold for OCC-based CCA may be configured independently of a CCA threshold for a general energy detection (ED) scheme.

Figure 11:
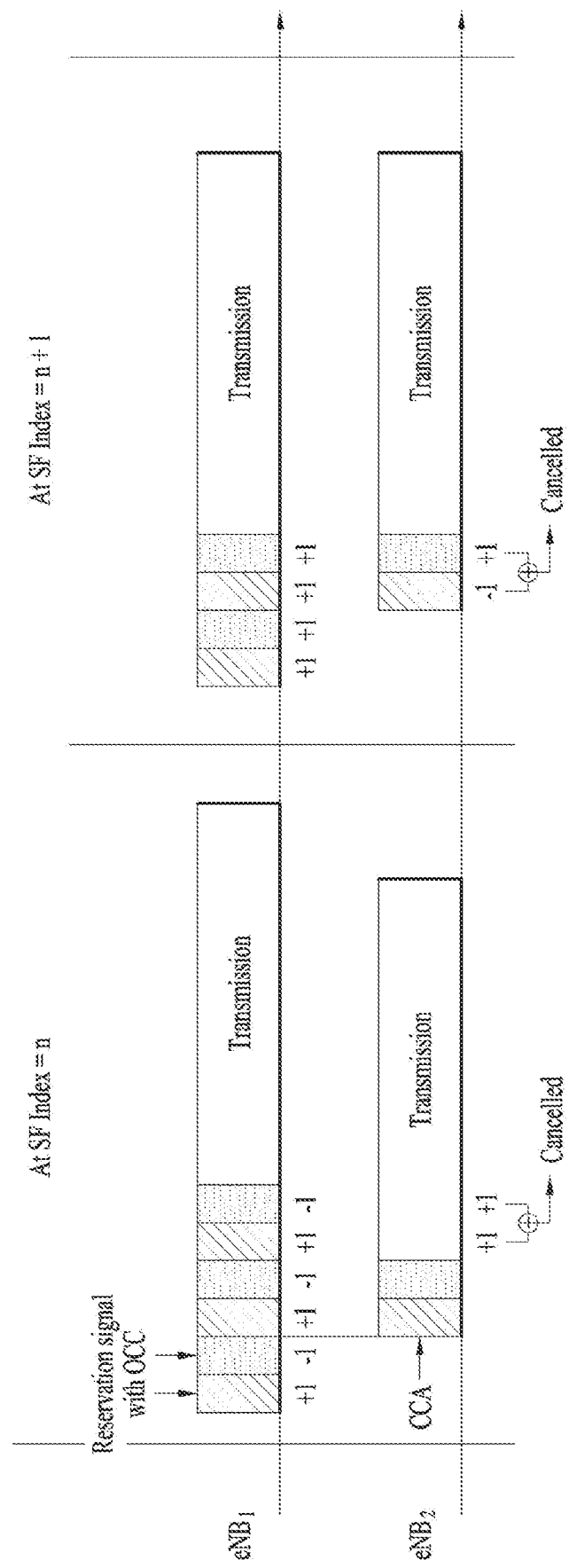
FIG. 11 illustrates exemplary OCC-based channel sensing according to an embodiment of the present invention.

As an additional operation of the present invention, it is proposed that a node of a node group capable of (or recommended for) simultaneous transmission transmits a known signal by applying $OCC_0$ to the known signal, and when a CCA-performing node applies $OCC_1$ orthogonal to $OCC_0$ during CCA, $OCC_0$ and $OCC_1$ are changed according to the time index of a specific transmission unit. FIG. 11 illustrates a method for, when $eNB_1$ and $eNB_2$ belong to a node group recommended for simultaneous transmissions, changing an OCC pair (for example, $OCC_0$ and $OCC_1$) based on an SF index according to a specific embodiment of the present invention.

If the additional operation is applied, the OCC-based CCA operation may be designed in such a manner that even though an OCC is applied to a known signal of a node of a different wireless business operator, the probability of canceling the known signal is reduced, and thus cancellation of a known signal is possible only between nodes within a network of a single wireless business operator.

While the OCC-based CCA method has been described above as a method for applying an OCC to N time slots, the OCC-based CCA method may be extended to an operation for transmitting a known signal by applying an OCC to N random orthogonal resources (e.g., frequency resources or spatial resources) and performing CCA by applying an OCC to the N orthogonal resources.

Method for Sensing Collision with Network of Different Wireless Business Operator According to a specific embodiment of the present invention, it is proposed that a sequence of a known signal is generated using an operator ID as one of factors of a seed values. Herein, the known signal may be a reservation signal (or preamble) which the node transmits for channel occupation during a time period spanning from a time of CCA success until before data transmission, or an RS (e.g., CRS, DM-RS, CSI-RS, or DRS) for channel estimation and data demodulation.

According to the afore-described OCC-based CCA method, in a situation where it is difficult to distinguish OCCs of different wireless business operators from each other due to an insufficient number of time slots, a CCA-performing node may cancel a reservation signal transmitted by a node within a network of a wireless business operator other than a wireless business operator to which the CCA-performing node belongs, through OCC-based CCA. For example, if although $eNB_1$ and $eNB_2$ are included in networks of different wireless business operators, $eNB_1$ applies the same OCC [+1 −1] for transmission of a reservation signal in FIG. 10, $eNB_2$ performs simultaneous signal transmission with $eNB_1$ although $eNB_1$ is not for FR, as illustrated in FIG. 10.

Accordingly, as another method for distinguishing heterogeneous wireless operator networks in the embodiment of the present invention, it is proposed that a sequence of a known signal transmitted in an unlicensed band by an LTE node is generated using a wireless operator ID or an operator ID as a seed value. Herein, a CCA-performing node may perform a modification of the afore-described OCC-based CCA method as follows.

Each of CCA-performing nodes performs at least one of the following operations.

The node sums signals in the N time slots by applying one OCC of OCC group 2 to the N time slots and then performs power detection (or energy detection) for CCA.

If power (or energy) detected by the above operation is lower than a preset CCA threshold, the node detects a known signal having an operator ID of an operator to which the node does not belong.

If a known signal having an operator ID of an operator to which the node does not belong is not detected, the node transmits a signal during a channel occupancy time.

If a known signal having an operator ID of an operator to which the node does not belong is detected, the node attempts to detect a known signal of a node group to which the node belongs on a time slot basis.

Upon detection of the known signal, the node calculates reception power (or energy) from which reception power of the known signal is canceled in a corresponding time slot.

If the known signal is not detected, the node calculates reception power (or energy) for the corresponding time slot.

Subsequently, if the sum of reception power (or energy) of each time slot for the N time slots is lower than a preset CCA threshold, the node transmits a signal after the last time slot.

If reception power (or energy) of the last time slot is lower than a preset CCA threshold, the node transmits a signal after the last time slot.

If the detected power (or energy) detected by the above operation is higher than the preset CCA threshold, the node may defer signal transmission (e.g., apply a backoff), determining that the channel is occupied.

Figure 12:
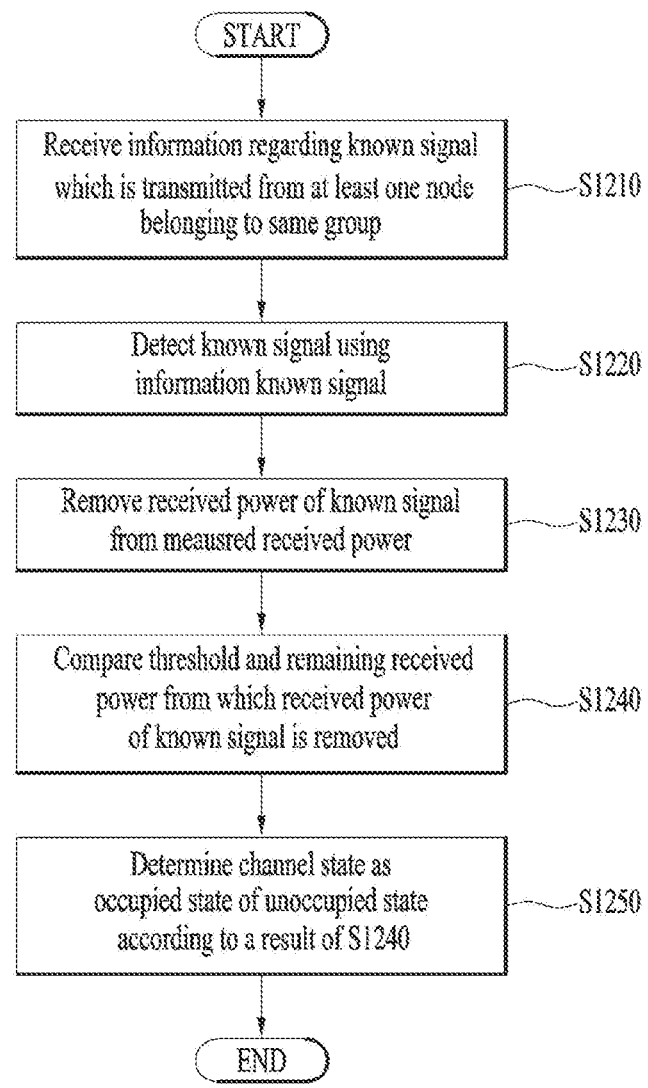
FIG. 12 illustrates an operation according to an embodiment of the present invention.

FIG. 12 illustrates an operation according to an embodiment of the present invention. In the method for channel sensing in an unlicensed band in a wireless communication system, the method of FIG. 12 may be performed by a channel-sensing node.

The node may receive information about a known signal transmitted by at least one other node of the same node group (S1210). The node may detect the known signal using the information about the known signal (S1220). The node may cancel reception power of the known signal from measured reception power, during a time period over which the known signal is detected (S1230). The node may compare the remaining reception power except for the canceled reception power of the known signal with a threshold (S1240). The node may determine whether a channel is occupied or unoccupied according to the comparison (S1250). If the channel is occupied, the node may transmit a signal during a channel occupancy time.

The information about the known signal may include at least one of a sequence of the known signal, transmission power of the known signal, a valid duration of the reception power of the known signal, a power offset between a transmission signal and the known signal during the valid duration, or a cancelation ratio of reception power of the transmission signal during the valid duration.

Also, the valid duration may include a subframe in which the known signal is detected or a subframe carrying a signal of which the reception power may be derived from the reception power of the known signal.

Further, the known signal may include a reservation signal or preamble transmitted for channel occupation during a time period spanning from channel sensing success until before transmission of a signal during a channel occupancy time, or an RS for channel estimation and data demodulation.

If the information about the known signal includes information about the valid duration or the known signal indicates the valid duration, the node may cancel the reception power of the known signal from total reception power during the valid duration.

If the known signal is transmitted in a plurality of OFDM symbols, the known signal may be transmitted with predetermined phase differences indicating the remaining lengths of a Tx burst to which the known signal belongs in different OFDM symbols. In this case, the node may use the reception power of the known signal in calculating reception power for channel sensing during a time period corresponding to the remaining length of the Tx burst.

While the embodiments of the present invention have been described in brief with reference to FIG. 12, an embodiment related to FIG. 12 may include at least a part of the afore-described embodiment(s), alternatively or additionally.

Figure 13:
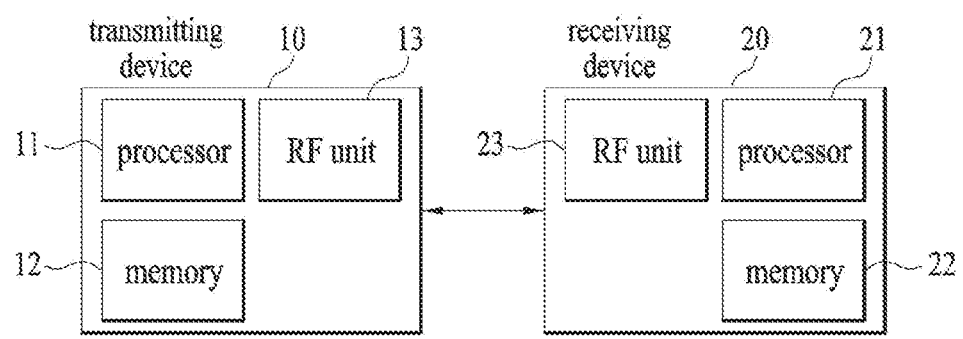
FIG. 13 is a block diagram of devices for implementing an embodiment(s) of the present invention.

FIG. 13 is a block diagram of a transmitting device 10 and a receiving device 20 configured to implement exemplary embodiments of the present invention. Referring to FIG. 13, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

The transmitting device and/or the receiving device may be configured as a combination of one or more embodiments of the present invention.

The embodiments of the present application has been illustrated based on a wireless communication system, specifically 3GPP LTE (-A), however, the embodiments of the present application can be applied to any wireless communication system in which interferences exist.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method performed by a first apparatus in a wireless communication system, the method comprising:
   receiving a known signal;
   determining whether a channel available to be used for a plurality of radio technologies is occupied based on remaining power, wherein the remaining power is obtained based on cancelling a first value from power obtained on a time duration; and
   transmitting a signal on the channel based on the determination,
   wherein the time duration is determined based on the known signal,
   wherein the first value is determined based on reception power of the known signal and a cancellation ratio, and
   wherein the cancellation ratio is equal to or higher than 0 and equal to or less than 1.

2. The method of claim 1, further comprising:
   transmitting, to a second apparatus, information on a range of a transmission power of the signal; and
   receiving, from the second apparatus, a request to reduce the transmission power in response to the information on the range,
   wherein the transmission power is determined based on the request as a second value within the range to enable simultaneous transmission in the channel between the first apparatus and the second apparatus.

3. The method of claim 2, wherein the first apparatus and the second apparatus are included in a predetermined group of a plurality of apparatuses configured to allow simultaneous transmission in the channel.

4. The method of claim 3, wherein the known signal comprises a sequence obtained based on an identifier on identifying whether the second apparatus is included in the predetermined group, and
   wherein the transmission of the signal is performed based on the identifier identifying that the second apparatus is included in the predetermined group.

5. A first apparatus configured to operate in a wireless communication system, the first apparatus comprising:
   a memory; and
   at least one processor coupled with the memory,
   wherein the at least one processor is configured to:
   receive a known signal;
   determine whether a channel available to be used for a plurality of radio technologies is occupied based on remaining power, wherein the remaining power is obtained based on cancelling a first value from power obtained on a time duration; and
   transmit a signal on the channel based on the determination,
   wherein the time duration is determined based on the known signal,
   wherein the first value is determined based on reception power of the known signal and a cancellation ratio, and
   wherein the cancellation ratio is equal to or higher than 0 and equal to or less than 1.

6. The first apparatus of claim 5, wherein the at least one processor is further configured to:
   transmit, to a second apparatus, information on a range of a transmission power of the signal; and
   receive, from the second apparatus, a request to reduce the transmission power in response to the information on the range,
   wherein the transmission power is determined based on the request as a second value within the range to enable simultaneous transmission in the channel between the first apparatus and the second apparatus.

7. The first apparatus of claim 6, wherein the first apparatus and the second apparatus are included in a predetermined group of a plurality of apparatuses configured to allow simultaneous transmission in the channel.

8. The first apparatus of claim 7, wherein the known signal comprises a sequence obtained based on an identifier on identifying whether the second apparatus is included in the predetermined group, and
   wherein the transmission of the signal is performed based on the identifier identifying that the second apparatus is included in the predetermined group.

9. The method of claim 1, wherein the channel is configured in an unlicensed band.

10. The first apparatus of claim 5, wherein the channel is configured in an unlicensed band.

* * * * *